United States Patent [19]

Cuse

[11] Patent Number: 4,714,371
[45] Date of Patent: Dec. 22, 1987

[54] SYSTEM FOR THE TRANSMISSION OF POWER

[76] Inventor: Arthur R. Cuse, 336 S. Occidental Blvd., Los Angeles, Calif. 90057

[21] Appl. No.: 864,872

[22] Filed: May 20, 1986

[30] Foreign Application Priority Data

Sep. 13, 1985 [MX] Mexico .................................. 206624

[51] Int. Cl.⁴ ........................... F16B 3/00; B25G 3/28
[52] U.S. Cl. .................................... 403/355; 403/365; 403/383
[58] Field of Search ............... 403/355, 357, 372, 365, 403/383, 375, 369, 366, 367, 356

[56] References Cited

U.S. PATENT DOCUMENTS

| | | | |
|---|---|---|---|
| 2,177,924 | 10/1939 | Buckwalter | 403/365 |
| 2,841,020 | 7/1958 | Van Deventer, IV | 403/365 |
| 2,919,940 | 1/1960 | Anderson | 403/365 |
| 3,436,106 | 4/1969 | Luenberger | 403/356 |
| 3,511,492 | 5/1970 | Galbato | 403/225 |
| 3,574,365 | 4/1971 | Bailey et al. | 403/356 |
| 4,131,381 | 12/1978 | Alberts | 403/375 |
| 4,306,466 | 12/1981 | Coveney | 403/356 X |
| 4,486,116 | 12/1984 | Sassi | 403/367 |

FOREIGN PATENT DOCUMENTS

| | | |
|---|---|---|
| 1935799 | 1/1966 | Fed. Rep. of Germany . |
| 1356948 | 6/1974 | United Kingdom . |
| 2041494 | 9/1980 | United Kingdom . |

Primary Examiner—Richard J. Scanlan, Jr.
Assistant Examiner—Peter M. Cuomo
Attorney, Agent, or Firm—Charles H. Schwartz; Ellsworth R. Roston

[57] ABSTRACT

A system for the transmission of power formed by a block that has a channel, groove or canal of some length, one or more keys that come in contact with the groove, guide, or with the walls of the channel and with the key or keys holding a shaft or quill in eccentric holes in the keys. The system serves to eliminate or compensate for vibration caused by bent shafts or quills as well as the noise and wear that these can produce.

18 Claims, 18 Drawing Figures

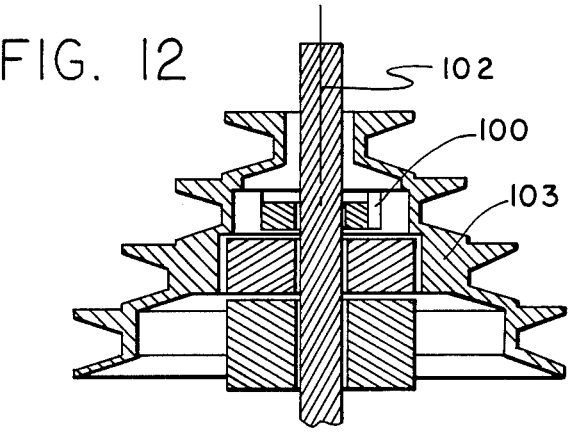
FIG. 12
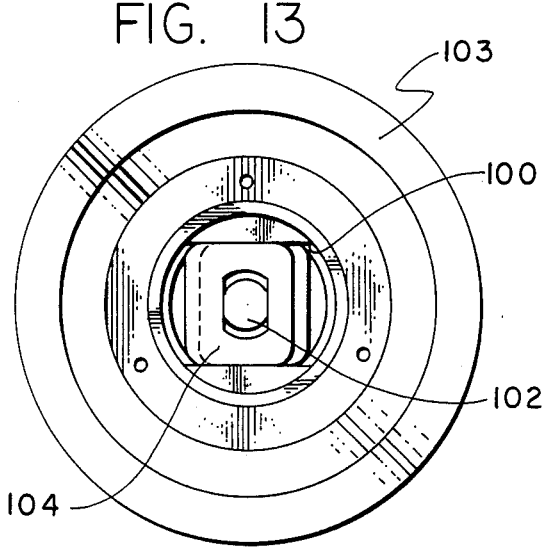
FIG. 13
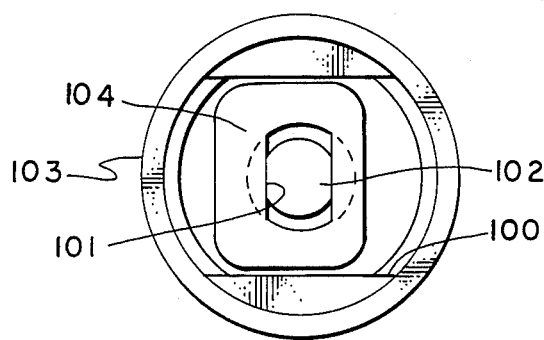
FIG. 14    FIG. 15
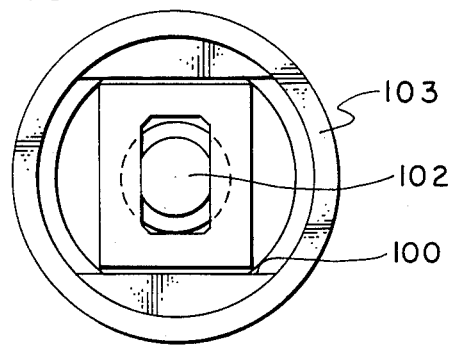
FIG. 16    FIG. 17
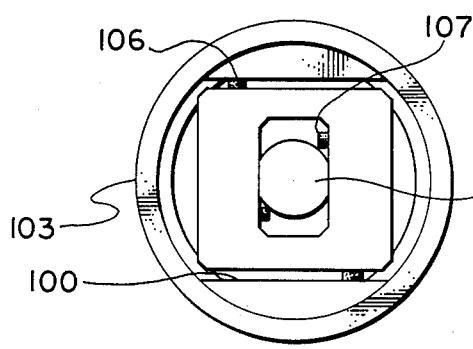
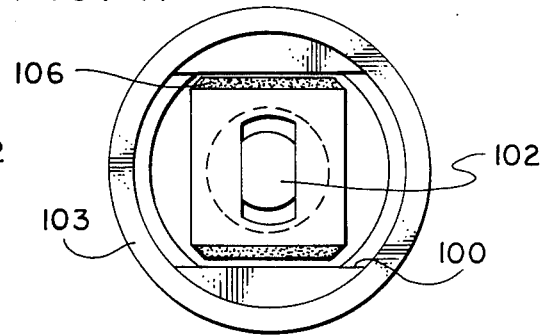
FIG. 18
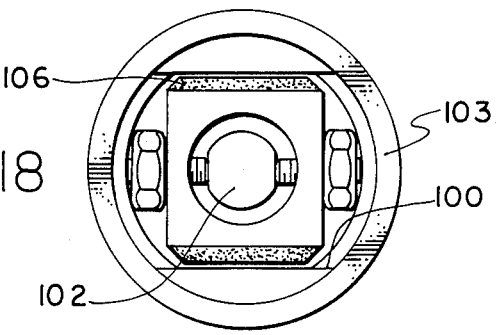

SYSTEM FOR THE TRANSMISSION OF POWER

TECHNICAL FIELD OF THE INVENTION

The invention consists of a system for coupling structures together for the transmission of power. It is especially useful in the reduction or complete elimination of vibration and noise caused by mis-shapen or mistreated pieces, such as shafts and pulleys. The usual uses of the invention that is described are for applications between shafts or quills and a plurality of pulleys, discs or similar items.

HISTORY OF THE INVENTION

In the prior development, there has been described a light industrial drill press. During the development of said drill press, it was found out the lighter the drill press, the more sensitive the drill press was to vibrate caused by various rotating pieces. To solve this problem, the present invention incorporates a coupling or transmission system with characteristics that permit eccentric movements of a shaft that either transmits or receives power. The specific embodiment of the invention includes a special key as a transmission part between a shaft and a pulley.

The systems of the present invention essentially consists of a key that has a hole in it. Through this hole slides a quill or shaft and therefore the two pieces provide a rotating structure. The drive key is located in a groove, guide or channel against which it presses, or is pressed to transmit rotary power. In this design, the hole in the key is generally rectangular to fit with a quill or shaft that has one or two flat faces and is thereby not completely a round shaft.

The hole in the drive key is longer than for a tight fit with the shaft, so as to permit sliding movement of the shaft or quill in the hole in one plane. The groove, guide or channel in which the drive key fits is longer than the key to permit the free sliding of the key in the other plane to compensate for any eccentric spin of the quill or shaft.

The above described system thereby functions with great efficiency. It has been determined that the eccentricity of the shaft or quill is taken up by the free sliding movement of the shaft with respect to the drive key during rotation of both parts and by the free sliding movement of the drive key with respect to the groove, guide or channel also during rotation of both parts. Although the above described system can compensate for eccentricities in the system, the system can permit vibrations in the system which can generate disturbing noise. This is due to torsional vibration which in turn is due to the great number of changes in rotational velocity that occur in all quills or shafts. Factors that contribute to this vibrational effect are things such as varying electric power, belt vibration or motor vibration.

The present invention additionally permits compensation of vibration in quills and shafts, so that the system can run without noise while at the same time have the other advantages described above and which will become evident as further described in this application.

OBJECTS OF THE INVENTION

One objective of this invention is a system for transmitting power while compensating for vibration, eccentricity and noise.

Another objective is a system for the transmission of power that will run or operate for long periods of time.

Still another objective is a system of power transmission that is easy and cheap to manufacture and will have universal application.

With the object of illustrating the invention, a set of drawings are attached in which the following is shown:

FIG. 12 is a sectional view of the drive key shown in FIG. 2 and located in a working position inside a pulley.

FIG. 13 is a bottom view of FIG. 11 showing the pair of drive keys of FIG. 1 located in the channel, groove or guide of a pully.

FIG. 14 is a view of the drive key shown in FIG. 2, inside its channel, groove or guide.

FIG. 15 is a view of the drive key shown in FIG. 3, in its channel, groove or guide.

FIG. 16 is a view of the drive key shown in FIG. 4, inside its channel, groove or guide.

FIG. 17 is a view of a set of the drive keys shown in FIG. 5 in its channel, groove or guide, with a strip of rubber acting as a shock absorber between the keys and the channel.

FIG. 18 is a view of the adjustable drive key shown in FIG. 6 and with a rubber shock absorber between the key and the channel.

DETAILED DESCRIPTION OF THE DRAWINGS

Figure 1:
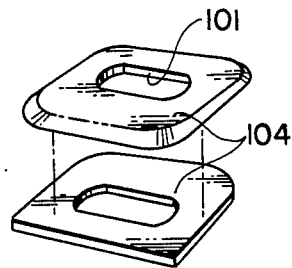
FIG. 1 is a perspective view of a pair of drive keys used in combination.

The present invention consists of a coupling system for the transmission of power that permits relative movement between the parts that form the coupling system. It consists of a channel, groove or guide 100 illustrated in FIGS. 3 through 18 in which are one or more drive keys illustrated in FIGS. 1 through 6. Each drive key has a hole 101, longer than the width of the shaft that passes through the hole. This hole serves to enter into contact with a quill or shaft 102.

In the preferred configurations of the invention, the groove 100 is longer than the key to permit the sliding or displacement of a key or keys along the length of the groove. At the same time, the long hole 101 in the key, permits the sliding along the length of the hole of the quill or shaft 102. This provides two axis of sliding which may be identified as the "x" and "y" axis. The long hole 101 in the key is therefore transverse to the channel 100. A quill or shaft, 102, if slightly bent, describes an eccentric movement on rotation and this movement is compensated for on one axis by a sliding of the key along the length of the groove, and along the other axis by the sliding space in the hole 101 in the drive key. In this manner, the transmission of power between the quill or shaft 102 and a pulley or disc 103 is continuous and positive while at the same time the eccentric movement, such as by a bent quill or shaft 102, is compensated for.

The system of the present invention permits utilization of keys of various sizes and shapes. It is possible to use drive keys completely metallic or keys with their contact surfaces covered with resilient material such as rubber. The present invention may also use springs in compression between the drive key and the groove 100 in which it is located to absorb noise and vibration due to the reasons described above. Ideally, drive keys without rubber or springs are better since they do not require as much maintenance in continuous use.

Figure 11:
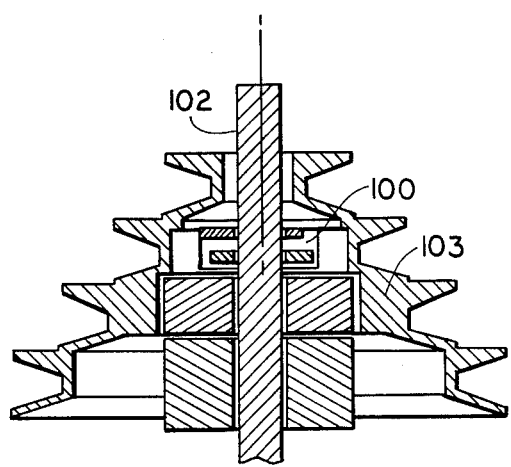
FIG. 11 is a sectional view of the pair of drive keys shown in FIG. 1 and located in a working position inside a pulley.

In FIGS. 1, 11 and 13, a pair of drive keys are shown located in the channel 100, in a relationship and function such as has been described above. Each one of these keys has a long hole 101, not at the center of the key. This means that in each key, there is an eccentric area 104, whose weight will increase considerably when the system is in rotation. The eccentric area forces each key against the corresponding wall of the channel 100, or against the quill or shaft 102, depending on where the eccentric weight is on the key.

Vibration and/or noise is thereby absorbed by the pressure that is exerted by each key on the quill or shaft 102 and/or against the wall of the channel 100. The weight increment of the eccentric area 104 (in rotation) is a function of the distance the eccentric area 104 is in relation to the center of quill or shaft 102, the velocity in revolutions per minute of the quill or shaft 102 and the weight of the eccentric area 104. It is to be appreciated that the number of keys does not have to be limited to two. You can stack three or more keys and the effect will be the same. However, it is recommended but not necessary that the eccentric area 104 of each drive key is in an opposite position to the next key, so that the eccentric weight is compensated. If this is not done, the weight of the eccentric areas 104 can itself produce some vibration of a minor value.

Figure 2:
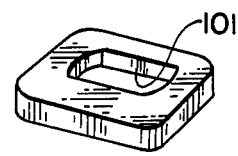
FIG. 2 is a perspective view of one drive key thicker than that shown in FIG. 1.

In FIGS. 2, 12 and 14, a drive key is illustrated similar to that illustrated in FIG. 1. However, this key is thicker and can be utilized by itself, or in pairs or in more than pairs. It also can be used in combination with the drive keys shown in FIG. 1.

Figure 3:
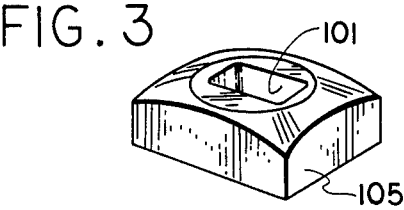
FIG. 3 is a perspective view of a drive key with a rectangular hole in the center.
Figure 7:
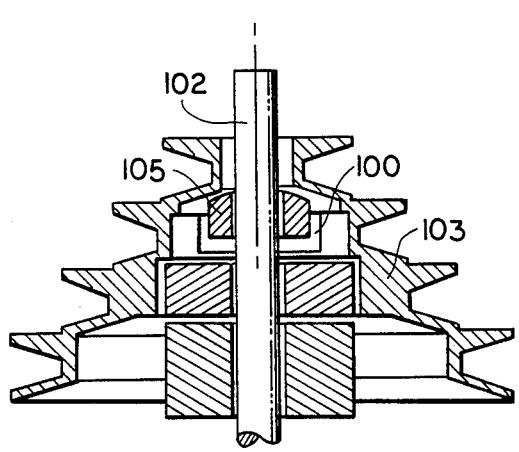
FIG. 7 is a sectional view of the drive key shown in FIG. 3, and located in a working position inside a pulley.

The drive key shown in FIGS. 3, 7 and 15 is located in channel 100 in the same manner as for the other drive keys described. Specifically, the drive key is positioned to have the long hole 101 in the key transverse to the channel 100. the hole in this drive key is perfectly centered. If desired, it is possible to cover the sides that come in contact with the walls of channel 100 with a resiliant material, or use a spring, on one or more sides 105 to permit vibration and noise to be absorbed.

Figure 4:
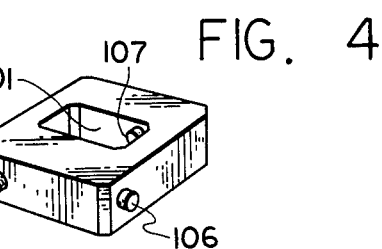
FIG. 4 is a perspective view of a drive key including absorptive material such as rubber or springs for absorbing vibration.
Figure 8:
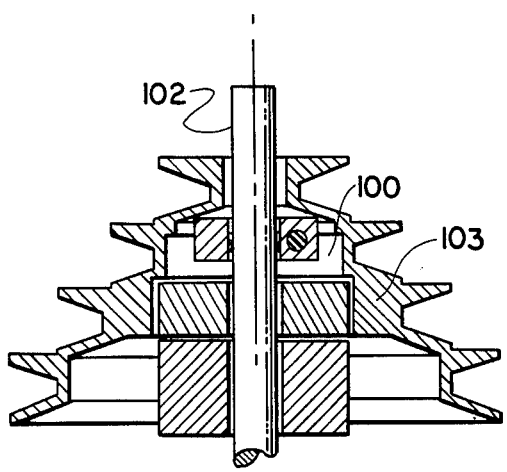
FIG. 8 is a sectional view of the drive key shown in FIG. 4, and located in a working position inside a pulley.

The drive key of FIGS. 4, 8 and 16 is similar to that of FIG. 3, and with a long hole 101 centered in the drive key. In this assembly, portions of the drive key are covered with resiliant material, such as rubber to absorb vibration and noise.

In this case, a portion of the key is shown with rubber 106 on the exterior, to contact the walls of the channel 100, and a portion of the interior of the key is also shown with rubber 107, to contact the quill or shaft 102.

Figure 5:
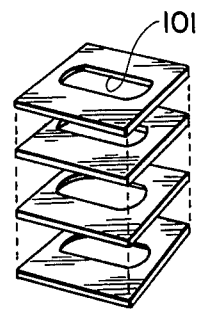
FIG. 5 is a perspective view of a series of drive keys each relatively thin for applications of heavy loading or with large torsion.
Figure 9:
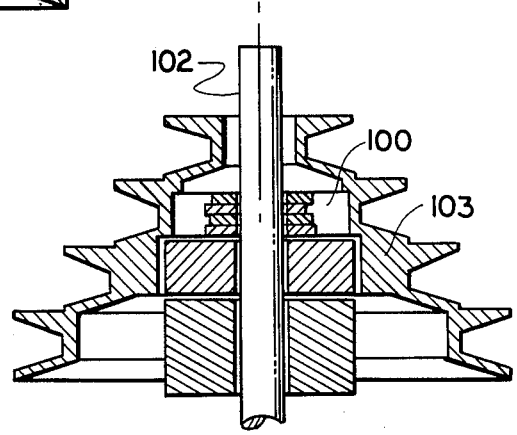
FIG. 9 is a sectional view of the drive key shown in FIG. 5, and located in a working position inside a pulley.

In FIGS. 5, 9 and 17, a group of thin keys is shown. The object of this assembly is to show the great versatility in the use of drive keys, the number of which can vary in accordance with the load, method of key fabrication and space available in the channel 100. Besides this, it is possible to intermix drive keys of various materials to obtain special effects. For example pieces of resiliant materials can be placed between drive keys to absorb vibration and noise.

Figure 6:
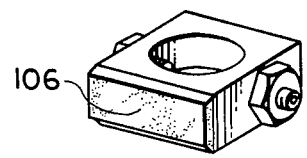
FIG. 6 is a perspective view of an adjustable drive key.
Figure 10:
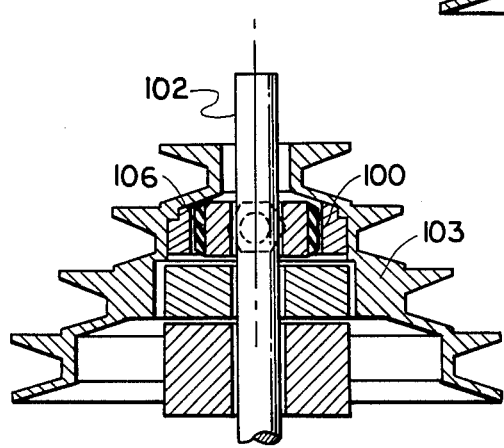
FIG. 10 is a sectional view of the drive key shown in FIG. 6, and located in a working position inside a pulley.

The drive key of FIGS. 6, 10 and 18 includes a threaded member and locking nut and is thereby adjustable in size and can be adapted as necessary to the size of the quill or shaft. This drive key typically includes a portion or area that is eccentric and is thereby similar to the eccentric area 104 in FIG. 1. This drive key may also includes a layer of resilient material 106.

Having described the invention as above, the following are the appended claims.

What is claimed is:

1. A coupling apparatus for rotary power transmission and axial movement between a first elongated rotary member and a second rotary member substantially concentric with the first elongated rotary member, including
    a channel portion formed in an interior portion of the second rotary member and having at least one flat guide surface,
    at least one drive key positioned within the channel portion of the second rotary member and including another flat guide surface complementary to the one flat guide surface to allow linear sliding movement between the drive key and the channel portion along the flat guide surfaces and to prevent relative rotational movement between the drive key and the channel portion,
    the at least one drive key additionally including an opening for receiving the first elongated rotary member, and
    means for coupling the first elongated rotary member within the opening of the drive key to allow axial movement between the first elongated rotary member and the drive key and to prevent relative rotational movement between the first elongated rotary member and the drive key.

2. The coupling apparatus of claim 1 wherein the channel portion has two flat guide surfaces parallel to and opposing each other and with the drive key positioned between the opposing guide surfaces.

3. The coupling apparatus of claim 2 wherein the drive key has two flat parallel guide surfaces complementary to the opposing guide surfaces of the channel portion.

4. The coupling apparatus of claim 1 wherein the opening in the at least one drive key includes at least one flat guide surface and the first elongated rotary member includes a complementary flat guide surface to allow linear sliding movement between the drive key and the elongated rotary member and to prevent relative rotational movement between the drive key and the elongated rotary member.

5. The coupling apparatus of claim 4 wherein the flat guide surfaces of the channel portion and the elongated rotary member are perpendicular to each other.

6. The coupling apparatus of claim 4 wherein the opening in the at least one drive key is noncentered to form an eccentric area to provide displacement of the drive key against the elongated rotary member by centrifugal force during rotation to suppress vibration and noise.

7. The coupling apparatus of claim 1 wherein the opening in the at least one drive key is noncentered to provide displacement of the drive key by centrifugal force during rotation to suppress vibration and noise.

8. The coupling apparatus of claim 1 wherein the at least one drive key includes additional resilient material to provide a shock absorber for vibration and noise.

9. The coupling apparatus of claim 1 including at least two drive keys each with a noncentered opening to form an eccentric area and with the eccentric areas opposing each other to provide opposite displacement of the two drive keys against the elongated rotary member by centrifugal force during rotation to suppress vibration and noise.

10. The coupling apparatus of claim 9 wherein the opening in each drive key includes at least one flat guide surface and the first elongated rotary member includes a complementary flat guide surface to allow linear sliding movement between the drive key and the elongated rotary member and to prevent relative rotational movement between the drive key and the elongated rotary member.

11. A coupling apparatus for rotary power transmission between a first rotary member and a second rotary member substantially concentric with the first rotary member, including
a channel portion formed in an interior portion of the second rotary member and having at least one flat guide surface,
at least one drive key positioned within the channel portion of the second rotary member and including another flat guide surface complementary to the one flat guide surface to allow linear sliding movement between the drive key and the channel portion along the flat guide surfaces and to prevent relative rotational movement between the drive key and the channel portion,
the at least one drive key additionally including a noncentered opening for receiving the first rotary member, and
means for coupling the first rotary member within the noncentered opening of the drive key to prevent relative rotational movement between the first elongated rotary member and the drive key and with the noncentered opening in the at least one drive key providing displacement of the drive key by centrifugal force during rotation to suppress vibration and noise.

12. The coupling apparatus of claim 11 wherein the channel portion has two flat guide surfaces parallel to and opposing each other and with the drive key positioned between the opposing guide surfaces.

13. The coupling apparatus of claim 12 wherein the drive key has two flat parallel guide surfaces complementary to the opposing guide surfaces of the channel portion.

14. The coupling apparatus of claim 11 wherein the noncentered opening in the at least one drive key includes at least one flat guide surface and the first rotary member includes a complementary flat guide surface to allow linear sliding movement between the drive key and the rotary member and to prevent relative rotational meovement between the drive key and the rotary member.

15. The coupling apparatus of claim 14 wherein the flat guide surfaces of the channel portion and the rotary member are perpendicular to each other.

16. The coupling apparatus of claim 11 wherein the at least one drive key includes additional resilient material to provide a shock absorber for vibration and noise.

17. The coupling apparatus of claim 11 including at least two drive keys each with a noncentered opening to form an eccentric area and with the eccentric areas opposing each other to provide opposite displacement of the two drive keys against the rotary member be centrifugal force during rotation to suppress vibration and noise.

18. The coupling apparatus of claim 17 wherein the noncentered opening in each drive key includes at least one flat guide surface and the first rotary member includes a complementary flat guide surface to allow linear sliding movement between the drive key and the elongated rotary member and to prevent relative rotational movement between the drive key and the rotary member.

* * * * *